(12) United States Patent
Severinsson

(10) Patent No.: US 9,242,538 B2
(45) Date of Patent: Jan. 26, 2016

(54) ELECTRICALLY DRIVEN VEHICLE DRIVE AXLE ARRANGEMENT

(71) Applicant: BorgWarner TorqTransfer Systems AB, Landskrona (SE)

(72) Inventor: Lars Severinsson, Hishult (SE)

(73) Assignee: BorgWarner TorqTransfer Systems AB, Landskrona (SE)

( * ) Notice: Subject to any disclaimer, the term of this patent is extended or adjusted under 35 U.S.C. 154(b) by 0 days.

(21) Appl. No.: 14/380,731

(22) PCT Filed: Feb. 26, 2013

(86) PCT No.: PCT/EP2013/053794
§ 371 (c)(1),
(2) Date: Aug. 25, 2014

(87) PCT Pub. No.: WO2013/127778
PCT Pub. Date: Sep. 6, 2013

(65) Prior Publication Data
US 2015/0014071 A1    Jan. 15, 2015

(30) Foreign Application Priority Data
Mar. 1, 2012  (SE) ........................ 1250190

(51) Int. Cl.
*B60K 17/16* (2006.01)
*B60K 1/00* (2006.01)
*F16H 48/11* (2012.01)

(52) U.S. Cl.
CPC ................ *B60K 1/00* (2013.01); *B60K 17/165* (2013.01); *F16H 48/11* (2013.01); *B60K 2001/001* (2013.01)

(58) Field of Classification Search
CPC .. B60K 1/00; B60K 17/165; B60K 2001/001; F16H 48/11
USPC ..................... 180/65.7, 65.1, 65.235; 475/150
See application file for complete search history.

(56) References Cited

U.S. PATENT DOCUMENTS

| | | | | |
|---|---|---|---|---|
| 4,836,053 A * | 6/1989 | Eastman | ............... | B60K 17/344 74/15.86 |
| 6,358,173 B1 * | 3/2002 | Klemen | ................. | B60K 6/365 475/5 |
| 6,781,273 B2 * | 8/2004 | Jinupun | ......................... | 310/168 |
| 7,001,297 B2 * | 2/2006 | Shimizu | ................. | B60K 6/365 310/112 |
| 7,195,575 B2 * | 3/2007 | Kempf | .................... | B60K 6/36 475/149 |

(Continued)

FOREIGN PATENT DOCUMENTS

| | | |
|---|---|---|
| EP | 0442437 | 8/1991 |
| EP | 2159092 | 3/2010 |

(Continued)

*Primary Examiner* — Brodie Follman
*Assistant Examiner* — Brian Cassidy
(74) *Attorney, Agent, or Firm* — BrooksGroup

(57) ABSTRACT

A vehicle drive axle arrangement comprises an electric drive motor (1, 3), a left shaft (20) and a right shaft (23), coaxial with each other, in drive connection with the motor (1, 3), and intended for connection to respective driving half-axles of the vehicle in which the arrangement can be mounted, and a differential mechanism (6-19). The electric drive motor (1, 3) is coaxial with and arranged around the left shaft (20, 23), and the differential mechanism (6-19)—receiving rotary motion from the electric motor (1, 3)—comprises a reduction gearing (6, 7, 12, 13) and a planetary gearing (13-9), operatively connecting the two shafts (20-23).

10 Claims, 3 Drawing Sheets

(56) References Cited

U.S. PATENT DOCUMENTS

| | | | |
|---|---|---|---|
| 2007/0193795 A1 | 8/2007 | Forsyth | |
| 2009/0088288 A1* | 4/2009 | Nakajima | F16H 48/10 475/232 |
| 2013/0178322 A1* | 7/2013 | Takuno | F16H 1/32 475/178 |
| 2014/0141918 A1* | 5/2014 | Fukami et al. | 475/150 |
| 2015/0099600 A1* | 4/2015 | Nilsson | B60K 6/52 475/150 |

FOREIGN PATENT DOCUMENTS

| | | |
|---|---|---|
| JP | 2001039179 | 2/2001 |
| WO | 2008034520 | 3/2008 |

* cited by examiner

ELECTRICALLY DRIVEN VEHICLE DRIVE AXLE ARRANGEMENT

This application claims the benefit of Swedish Application No. 1250190-4 filed Mar. 1, 2012 and PCT Application No. EP2013/053794 filed Feb. 26, 2013.

TECHNICAL FIELD

The present invention relates to a vehicle drive axle arrangement, comprising an electric drive motor, a left shaft and a right shaft, coaxial with each other, in drive connection with the motor, and intended for connection to respective driving half-axles of the vehicle in which the arrangement can be mounted, and a differential mechanism.

BACKGROUND OF THE INVENTION

There is a current trend to develop hybrid cars, in which often the front axle is driven by an internal combustion engine and the rear axle is driven by an electric motor. Driving can occur by means of either axle or by a combination of the two. The electric motor is powered by batteries in the car, which may be charged by the internal combustion engine or otherwise.

An electrically driven drive axle arrangement shall be as simple, light-weight and cheap as possible while providing the necessary power and lifespan. Its dimensions shall be as small as possible, and its number of parts shall be as low as possible.

THE INVENTION

These different requirements may according to the invention be fulfilled in that the electric drive motor is coaxial with and arranged around the left shaft and that the differential mechanism—receiving rotary motion from the electric motor—comprises a reduction gearing and a planetary gearing, operatively connecting the two shafts.

The electric motor is preferably a non-permanent magnet motor, which provides the advantage that it does not need to be disconnected if inactive even at high revs.

In a preferred embodiment the reduction gearing in two stages comprises a drive gear on a hollow motor shaft coaxial with the left shaft in engagement with a driven gear on an intermediary shaft, the driven gear having a larger diameter than the drive gear, as well as a driving gear on the intermediary shaft in gear engagement with an outer ring of the planetary gearing, the outer ring having a larger diameter than the driving gear.

The drive gear, the driven gear, the driving gear, and the outer periphery of the outer ring are preferably helical gears.

In a practical embodiment the planetary gearing comprises the outer ring, planet gears in a planet carrier, and a sun wheel, the planet carrier being connected to the left shaft and the sun wheel being connected to the right shaft.

As the left shaft and the right shaft shall rotate in the same rotational direction, the planetary gearing can be of the meshed-planet type with two interengaging planet gears arranged in the common planet carrier between the outer ring and the sun wheel in equidistantly arranged pairs.

It is to be noted that the terms "left shaft" and "right shaft" are used for practical and descriptive reasons and are not meant to be limiting.

BRIEF DESCRIPTION OF THE DRAWINGS

The invention will be described in further detail below under reference to the accompanying drawings, in which.

DETAILED DESCRIPTION OF AN EMBODIMENT

Figure 1:
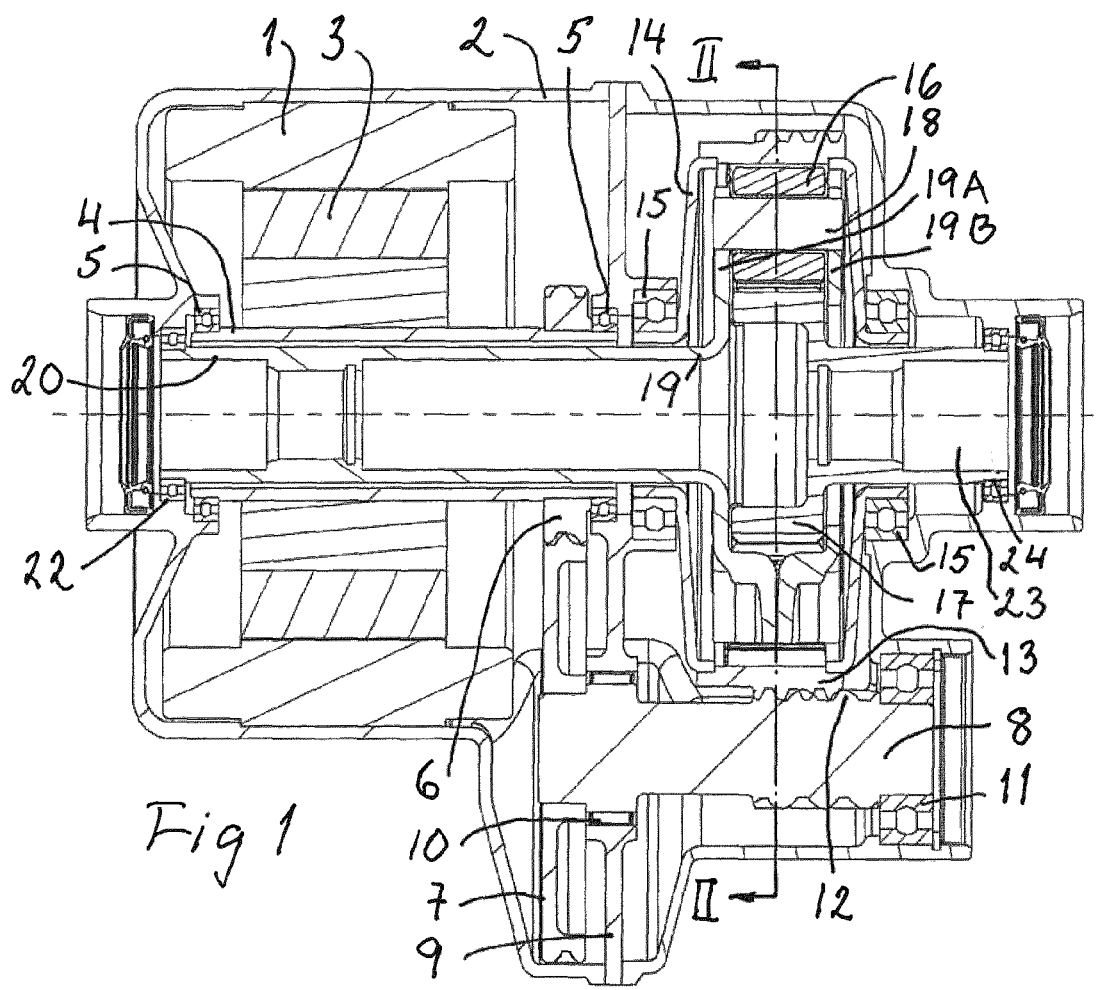
FIG. 1 is a longitudinal section through a drive axle arrangement according to the invention.

A stator 1 of an electric motor is mounted in a housing 2, and its rotor 3 is attached to a hollow motor shaft 4. The electric drive motor 1, 3 is a non-permanent magnet motor, for example a switched reluctance motor or an induction motor. The motor shaft 4 can be journalled in the housing 2 by means of two bearings 5.

It is to be noted that the term "housing 2" is used as a collective term and that the housing is assembled from several housing parts.

The motor shaft 4 is provided with a drive gear 6 in gear engagement with a driven gear 7 with a larger diameter than the drive gear 6, so that a rotational speed reduction is obtained from the drive gear to the driven gear. The gears 6 and 7 are preferably helical gears as shown.

The driven gear 7 is attached to an intermediary shaft 8 parallel with the motor shaft 4. The intermediary shaft 8 is journalled for rotation in a division wall 9 in the housing 2 by a bearing 10 and in the housing 2 by a bearing 11.

The intermediary shaft 8 is provided with a driving gear 12 (preferably of the helical type) in gear engagement with the outer periphery of an outer ring 13 of a planetary gearing to be described. The driving gear 12 may be integral with or attached to the intermediary shaft 8 and has a much smaller diameter than the driven gear 7 and of the outer ring 13 of the planetary gearing.

By this arrangement a rotational speed reduction from the electric motor 1 to the planetary gearing in two stages of some 10:1 is achieved.

The motor 1, 3 and the planetary gearing are coaxial.

The outer ring 13 of the planetary gearing is provided with or attached to side discs 14, over which it is journalled in the housing 2 by bearings 15.

Figure 2:
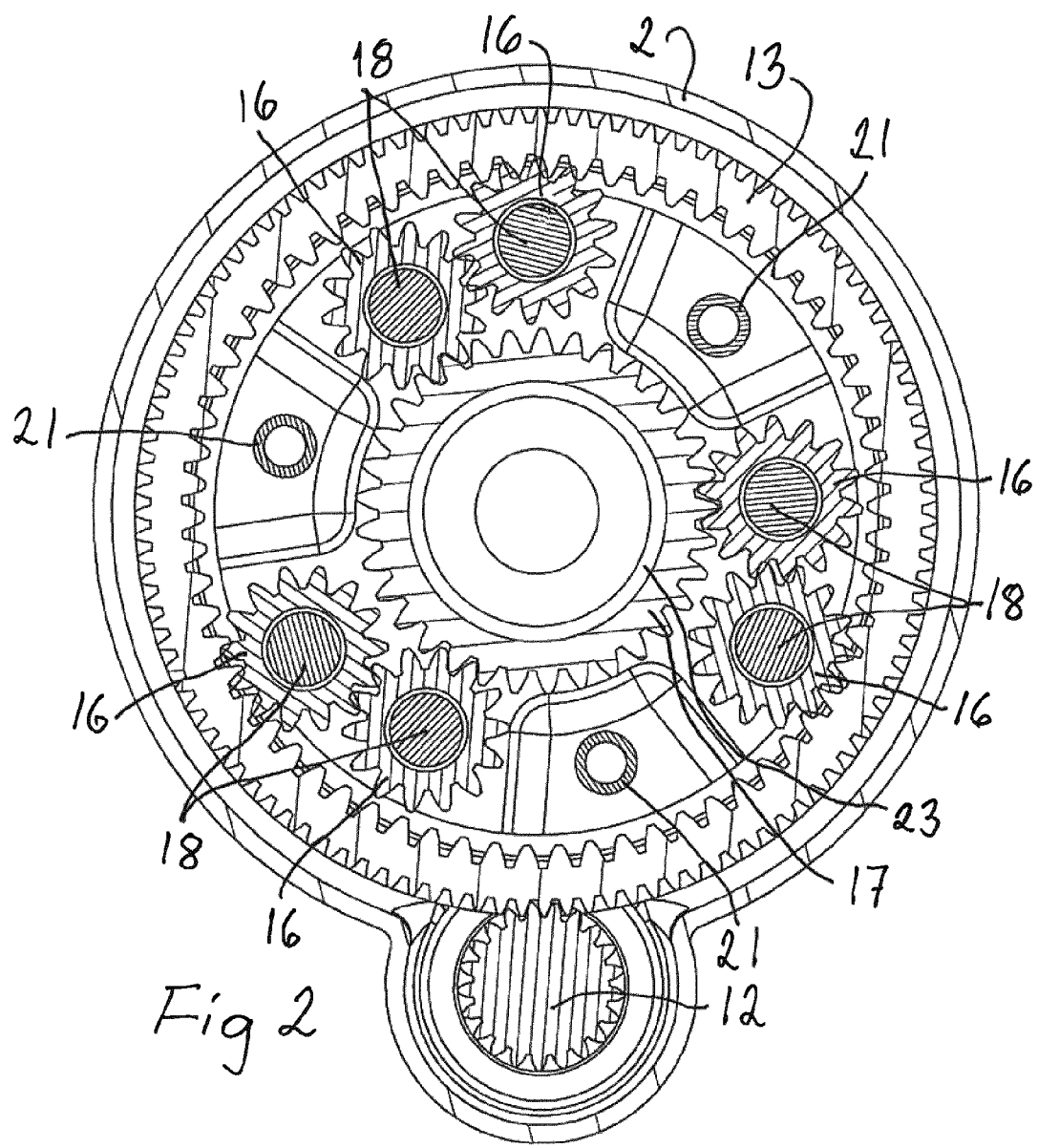
FIG. 2 is a cross section substantially along the line II-II in FIG. 1.
Figure 3:
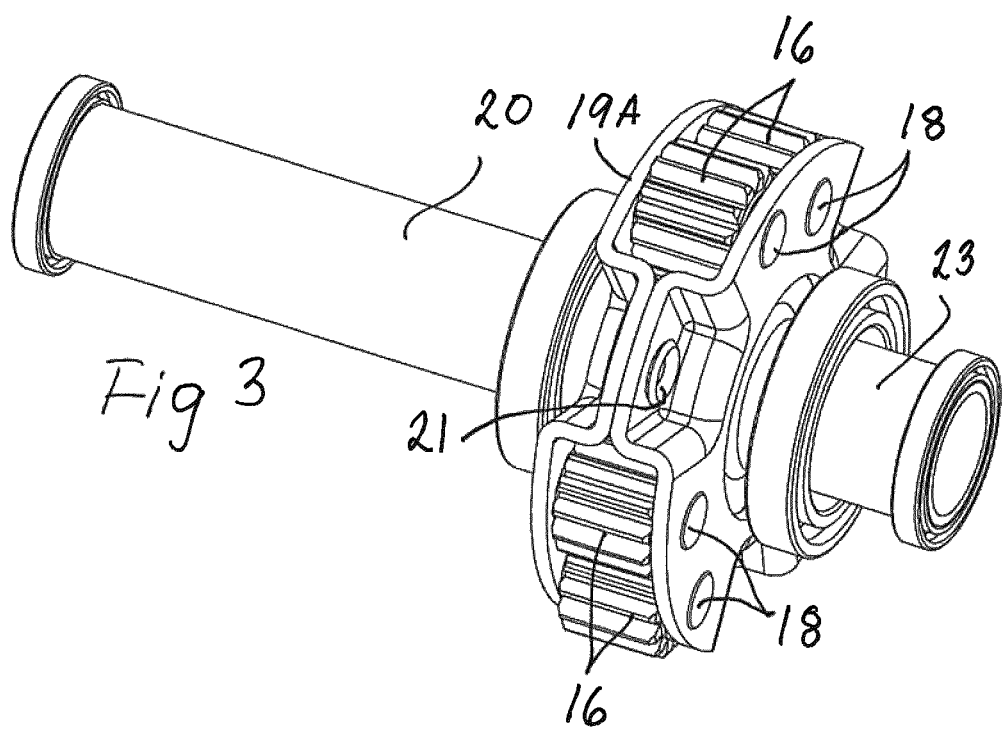
FIG. 3 is an isometric view of a sub-assembly of an arrangement shown in FIGS. 1 and 2.
Figure 4:
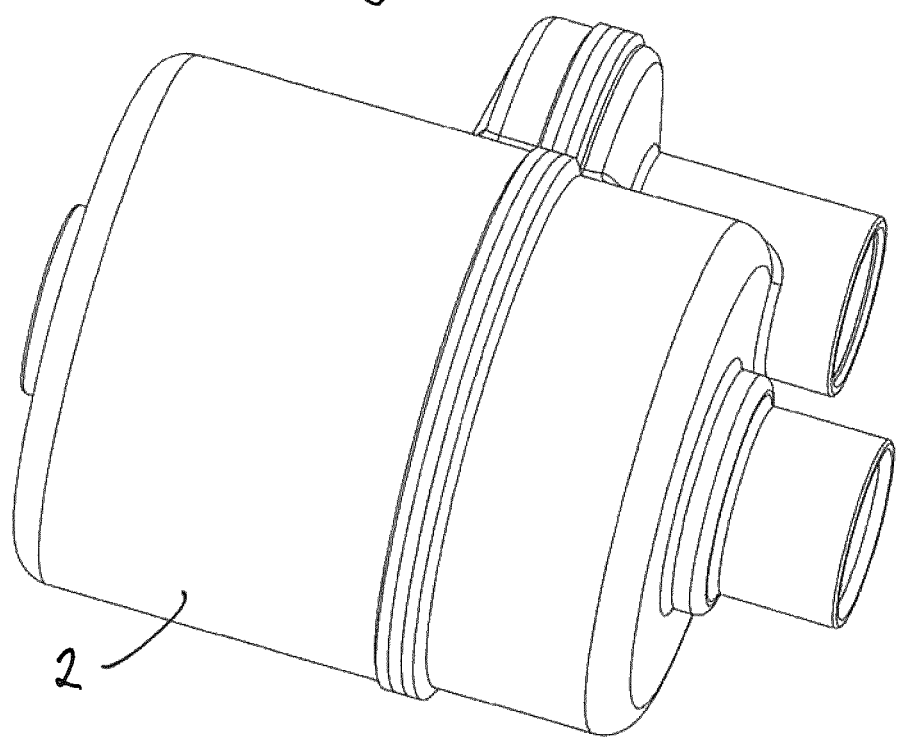
FIG. 4 is an external isometric view of the arrangement according to the invention.

As especially appears in FIG. 2, the planetary gearing is of the meshed-planet type with two interengaging planet gears 16, one in engagement with the outer ring 13 and one in engagement with a sun gear 17. In the shown embodiment there are three such pairs of planet gears 16, equidistantly arranged around the sun gear 17. The purpose of the use of two interengaging planet gears 16 in each pair is to obtain the same rotational direction for the outer ring 13 and the sun gear 17. There are other ways of obtaining the same result in a planetary gearing.

The planet gears 16 are journalled for rotation on planet gear shafts 18 in a planet carrier 19. The planet carrier 19 can consist of two members, namely—to the left of the planet gears 16 in FIG. 1—a drive flange 19A of a left shaft 20 and—to the right of the planet gears 16 in FIG. 1—a counter-flange 19B. In areas between the planet gears 16 (FIG. 2) the drive flange 19A and the counter-flange 19B may be connected by fastening means 21, so that a cage-like planet carrier 19 is formed.

The left shaft 20 can be journalled in the housing 2 by a bearing 22 towards its end to the left in FIG. 1. One of the two driving half-axles of the vehicle, in which the arrangement according to the vehicle is mounted, is to be drivingly connected to the left shaft 20.

The sun wheel 17 extends to the right in FIG. 1 and forms a right shaft 23, which may be journalled in the housing 2 towards its end by a bearing 24. The other one of the two driving half-axles of the vehicle, in which the arrangement according to the invention is mounted, is to be drivingly connected to the right shaft 23.

The different gear ratios in the arrangement are so chosen that the left shaft 20 and the right shaft 23 rotate with the same rotational speed (and in the same direction)—the rotation being imparted by the electric motor 1, 3 rotating at a much higher speed—under "normal" conditions, when no differential action between the left shaft 20 and the right shaft 23 is needed. A differential action when needed will be provided by the planetary gearing.

The use of a non-permanent magnet motor has the advantage that there is no need to disconnect the motor in the arrangement in the driving situations when the motor is inactive at even high revs, as no current in the motor windings is required.

The arrangement may be supplemented with more gear stages and/or a disconnect device and/or a torque vectoring device.

The invention claimed is:

1. A vehicle drive axle arrangement, comprising an electric drive motor, a left shaft and a right shaft, coaxial with each other, in drive connection with the motor, and intended for connection to respective driving half-axles of the vehicle in which the arrangement can be mounted, and a differential mechanism, characterized in that the electric drive motor is coaxial with and arranged around the left shaft and that the differential mechanism—receiving rotary motion from the electric motor—comprises a reduction gearing and a planetary gearing, operatively connecting the two shafts, wherein the electric motor is a non-permanent magnet motor, wherein the reduction gearing in two stages comprises a drive gear on a hollow motor shaft coaxial with the left shaft in engagement with a driven gear on an intermediary shaft, the driven gear having a larger diameter than the drive gear, as well as a driving gear on the intermediary shaft in gear engagement with an outer ring of the planetary gearing, the outer ring having a larger diameter than the driving gear.

2. An arrangement according to claim 1, wherein the drive gear, the driven gear, the driving gear, and the outer periphery of the outer ring are helical gears.

3. An arrangement according to claim 1, wherein the planetary gearing comprises the outer ring, planet gears in a planet carrier, and a sun wheel, the planet carrier being connected to the left shaft and the sun wheel being connected to the right shaft.

4. An arrangement according to claim 3, wherein the planetary gearing is of the meshed-planet type with two interengaging planet gears arranged in the common planet carrier between the outer ring and the sun wheel in equidistantly arranged pairs.

5. A vehicle drive axle comprising: a motor with a hollow motor shaft, a left shaft and a right shaft each in driven connection with the motor, and a differential mechanism comprising a reduction gearing and a planetary gearing, operatively connecting the two shafts, wherein the reduction gearing in two stages comprises a drive gear on the hollow motor shaft coaxial with the left shaft and in engagement with a driven gear on an intermediary shaft, the driven gear having a larger diameter than the drive gear, as well as a driving gear on the intermediary shaft in gear engagement with an outer ring of the planetary gearing, the outer ring having a larger diameter than the driving gear.

6. An arrangement according to claim 5 wherein the left shaft and the right shaft rotate in a common direction.

7. An arrangement according to claim 5 wherein the drive gear, the driven gear, the driving gear, and an outer periphery of the outer ring are helical gears.

8. An arrangement according to claim 5, wherein the planetary gearing comprises the outer ring, planet gears in a planet carrier, and a sun wheel, the planet carrier being connected to the left shaft and the sun wheel being connected to the right shaft.

9. An arrangement according to claim 8 wherein the sun wheel and the right shaft are integrally formed together.

10. An arrangement according to claim 8, wherein the planetary gearing is of the meshed-planet type with two interengaging planet gears arranged in the planet carrier between the outer ring and the sun wheel in equidistantly arranged pairs.

* * * * *